(12) United States Patent
Nakamura et al.

(10) Patent No.: US 11,167,806 B2
(45) Date of Patent: Nov. 9, 2021

(54) VEHICLE FRONT STRUCTURE

(71) Applicant: Toyota Jidosha Kabushiki Kaisha, Toyota Aichi-ken (JP)

(72) Inventors: Masato Nakamura, Okazaki (JP); Keisuke Suzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 16/829,488

(22) Filed: Mar. 25, 2020

(65) Prior Publication Data
US 2020/0369323 A1    Nov. 26, 2020

(30) Foreign Application Priority Data

May 22, 2019   (JP) .............................. JP2019-096166

(51) Int. Cl.
*B62D 25/20*    (2006.01)
*B62D 21/15*    (2006.01)
*B62D 25/08*    (2006.01)

(52) U.S. Cl.
CPC ....... *B62D 25/2018* (2013.01); *B62D 21/152* (2013.01); *B62D 25/082* (2013.01)

(58) Field of Classification Search
CPC .............. B62D 25/2018; B62D 21/152; B62D 25/082; B62D 25/14; B62D 21/15; B62D 25/08; B62D 25/20

USPC ..................................................... 296/193.09
See application file for complete search history.

(56) References Cited

U.S. PATENT DOCUMENTS 9,630,656 B2 *   4/2017   Yoshida ............. B62D 25/2036
9,821,853 B2 *   11/2017  Torikawa ............... B62D 25/14

FOREIGN PATENT DOCUMENTS

JP    2001-130450 A   5/2001
JP    2013-169806 A   9/2013

* cited by examiner

*Primary Examiner* — Pinel E Romain
(74) *Attorney, Agent, or Firm* — Dinsmore & Shohl LLP (57) ABSTRACT

The disclosure provides a vehicle front structure that includes a dash panel that separates a front compartment and a vehicle cabin from each other, and dash members attached to a surface of the dash panel on a side of the vehicle cabin. Right and left wheel house portions are provided in right and left lower half portions of the dash panel, respectively, the right and left wheel house portions projecting towards the vehicle cabin so as to configure rear walls of wheel houses for front tire wheel assemblies, respectively. The dash members are attached to surfaces of the wheel house portions on the vehicle cabin side, respectively, so as to obliquely extend downward and inward in a vehicle width direction from upper ends of the wheel house portions in the vehicle width direction, respectively.

5 Claims, 11 Drawing Sheets

VEHICLE FRONT STRUCTURE

CROSS-REFERENCE TO RELATED APPLICATIONS

This application claims priority to Japanese Patent Application No. 2019-096166 filed on May 22, 2019, which is incorporated herein by reference in its entirety including the specification, drawings and abstract.

BACKGROUND

1. Technical Field

The disclosure relates to a vehicle front structure, especially to a structure of a dash panel that separates a front compartment in a front part of a vehicle from a vehicle cabin.

2. Description of Related Art

It is required to reduce an amount of retraction of a dash panel when a vehicle has a collision. Therefore, a structure is proposed in which a gusset member extending in the vehicle width direction is attached to a center of a wheel house portion of the dash panel in the upper-lower direction so that an amount of retraction of the dash panel at the time of a collision is reduced (for example, see Japanese Unexamined Patent Application Publication No. 2013-169806 (JP 2013-169806 A)).

Also, a structure is proposed in which a dash member extending in the vehicle upper-lower direction along a wheel house portion of a dash panel is attached to the dash panel at a position where a front side member is connected. Thus, rigidity of the dash panel is increased (for example, see Japanese Unexamined Patent Application Publication No. 2001-130450 (JP 2001-130450 A)).

SUMMARY

When a vehicle has a small overlap collision, there are instances where a front tire wheel assembly comes into contact with a front surface of a wheel house portion of a dash panel. In such a case, a collision load from the front tire wheel assembly cannot be received sufficiently by the structure described in JP 2013-169806 A in which the gusset member extending in the vehicle width direction is attached to the wheel house portion, and by the structure described in JP 2001-130450 A in which the dash member extending in the vehicle upper-lower direction is attached next to the wheel house portion. Thus, it is not possible to sufficiently reduce retraction of the wheel house portion.

Therefore, an object of the disclosure is to reduce retraction of a dash panel when a vehicle has a small overlap collision.

A vehicle front structure according to the disclosure includes a dash panel that separates a front compartment in a front part of a vehicle and a vehicle cabin from each other, and a plurality of reinforcing members attached to a surface of the dash panel on a side of the vehicle cabin. Right and left wheel house portions are provided in right and left lower half portions of the dash panel, respectively. The right and left wheel house portions project towards the vehicle cabin and configure rear walls of wheel houses for front tire wheel assemblies, respectively. The reinforcing members are attached to surfaces of the wheel house portions on the side of the vehicle cabin, respectively so that the reinforcing members obliquely extend downward and inward in the vehicle width direction from upper ends of the wheel house portions in the vehicle width direction, respectively.

When a vehicle has a small overlap collision, the front tire wheel assembly retracts towards the wheel house portion of the dash panel while the front tire wheel assembly is rotating so that the direction of an axle changes from the vehicle width direction to the vehicle front-rear direction. In the front tire wheel assembly that is rotated so that the axle is located along the vehicle front-rear direction, a half of the front tire wheel assembly projects to an outer side in the vehicle width direction, and an upper half of a tire portion on an inner side in the vehicle width direction comes into contact with a surface of the wheel house portion on a side of the front compartment. At this time, a quarter arc portion of the tire portion of the front tire wheel assembly comes into contact with the surface of the wheel house portion on the side of the front compartment, the contact ranging from an upper end of the wheel house portion in the vehicle width direction and continuing downward and also inward in the vehicle width direction.

With the vehicle front structure according to the disclosure, the reinforcing members are attached to the surface of the wheel house portion on the side of the vehicle cabin so as to obliquely extend downward and inward in the vehicle width direction from the upper end of the wheel house portion in the vehicle width direction so that, in a view from the rear in the vehicle front-rear direction, each of the reinforcing members overlaps a region in which a collision load is input to the wheel house portion from the tire portion of the front tire wheel assembly at the time of a small overlap collision. Therefore, each of the reinforcing members is able to receive the collision load suitably, the collision load being input to the wheel house portion from the tire portion of the front tire wheel assembly. Thus, it is possible to reduce retraction of the dash panel at the time of a small overlap collision.

In the vehicle front structure according to the disclosure, the reinforcing members may obliquely extend downward and inward in the vehicle width direction from the upper ends of the wheel house portions in the vehicle width direction along curved lines, respectively so that at least parts of the reinforcing members project upward and inward with respect to the vehicle. Also, the curved line may be an arc of a radius similar to a radius of the tire portion of the front tire wheel assembly.

With this configuration, a region in which the reinforcing member overlaps the region where the collision load is input to the wheel house portion form the tire portion of the front tire wheel assembly at the time of a small overlap collision increases in a view from the rear in the vehicle front-rear direction. Therefore, the reinforcing member is able to receive the collision load more suitably, the collision load being input to the wheel house portion from the tire portion of the front tire wheel assembly. Thus, it is possible to reduce retraction of the dash panel more suitably at the time of a small overlap collision.

In the vehicle front structure according to the disclosure, a floor panel that configures a floor of the vehicle cabin may be provided. The floor panel includes a pair of right and left skeleton members extending in the vehicle front-rear direction. The right and left skeleton members are attached to the floor panel between both ends of the floor panel in the vehicle width direction, and a center of the floor panel in the vehicle width direction, respectively. A lower end portion of the dash panel may be connected with a front end portion of the floor panel. Lower end portions of the reinforcing members may be attached to a lower end of the dash panel at positions in the vehicle width direction, respectively, the positions corresponding to positions of front ends of the skeleton members.

With the configuration, a collision load received by each of the reinforcing members is transmitted smoothly to each of the skeleton members extending in the vehicle front-rear direction, and it is thus possible to reduce retraction of the dash panel more suitably.

The vehicle front structure according to the disclosure may include a pair of right and left side skeleton members and stopper members. The right and left side skeleton members extend in the vehicle front-rear direction towards the vehicle cabin from the front compartment and are located on inner sides of the right and left front tire wheel assemblies in the vehicle width direction, respectively. The stopper members include projections, respectively. The projections project frontward in the vehicle front-rear direction from front ends of the stopper members, respectively. The stopper members are attached to outer surfaces of the side skeleton members in the vehicle width direction, respectively so that the stopper members are positioned under the wheel house portions of the dash panel, respectively.

With this configuration, when the vehicle has a small overlap collision and the front tire wheel assembly is retracted and abuts on a surface of the dash panel on the side of the front compartment, the projection of the stopper member is engaged with the wheel of the front tire wheel assembly and restricts the position of the front tire wheel assembly. Therefore, in a view from the rear in the vehicle front-rear direction, it is possible to ensure more reliably that the region where a collision load is input to the wheel house portion from the tire portion of the front tire wheel assembly overlaps the position of each of the reinforcing members. Therefore, each of the reinforcing members is able to receive the collision load more suitably, the collision load being input to the wheel house portion from the tire portion of the front tire wheel assembly, and it is thus possible to reduce retraction of the dash panel more suitably at the time of the small overlap collision.

With the disclosure, it is possible to reduce retraction of the dash panel when the vehicle has a small overlap collision.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a vehicle front structure 100 according to an embodiment is described with reference to the drawings. In the description below, the vehicle front structure 100 of a vehicle in which a ladder frame 30 is used is described. An arrow FR, an arrow UP, and an arrow RH shown in each of the drawings represent the frontward direction (the advancing direction), the upward direction, and the rightward direction of a vehicle, respectively. Opposite directions to the arrows FR, UP, RH represent the rearward direction, the downward direction, and the leftward direction of the vehicle, respectively. Hereinafter, when description is given simply with use of the front-rear direction, the right-left direction, and the upper-lower direction, those directions represent front and rear in the vehicle front-rear direction, right and left in the vehicle right-left direction (the vehicle width direction), and upward and downward in the vehicle upper-lower direction, respectively, unless otherwise specified.

Figure 1:
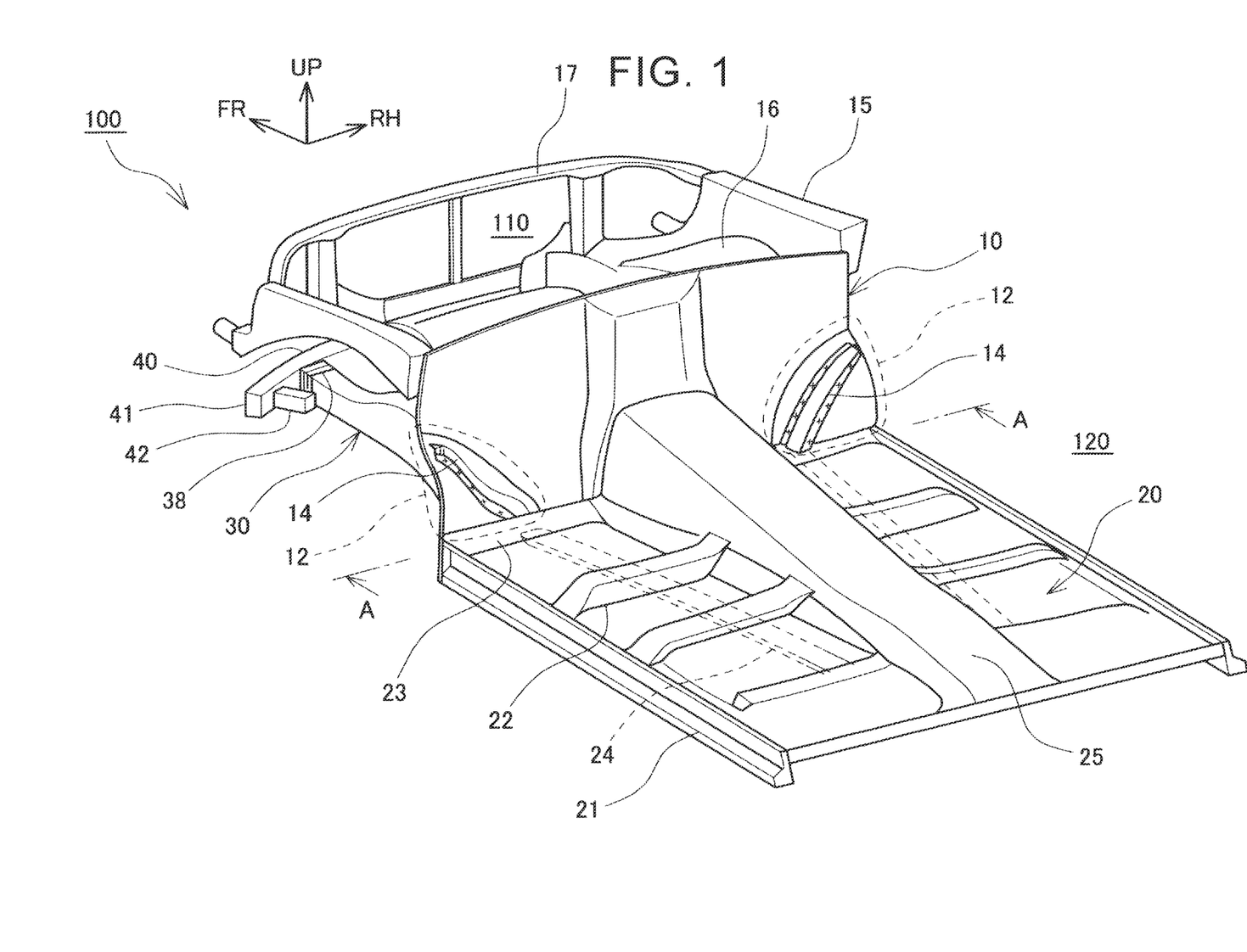
FIG. 1 is a perspective view of a vehicle front structure according to an embodiment, the vehicle front structure being seen from obliquely above and from a rear in the vehicle front-rear direction.

As shown in FIG. 1, the vehicle front structure 100 includes a dash panel 10 and a plurality of dash members 14. The dash panel 10 separates a front compartment 110 in a front part of the vehicle and a vehicle cabin 120 from each other. The dash members 14 are reinforcing members attached to a surface of the dash panel 10 on a side of the vehicle cabin 120.

The front compartment 110 is a space surrounded by right and left upper members 15, a cross member 17 located on the front side, and a front surface of the dash panel 10 in the vehicle front-rear direction, and vehicle driving mechanisms such as an engine and a driving motor are mounted inside the front compartment 110. Wheel houses 16 are attached to inner parts of the right and left upper members 15 in the vehicle width direction, respectively. Each of the wheel houses 16 is partially cylindrical and covers an upper part and a front part of a front tire wheel assembly 50.

Figure 2:
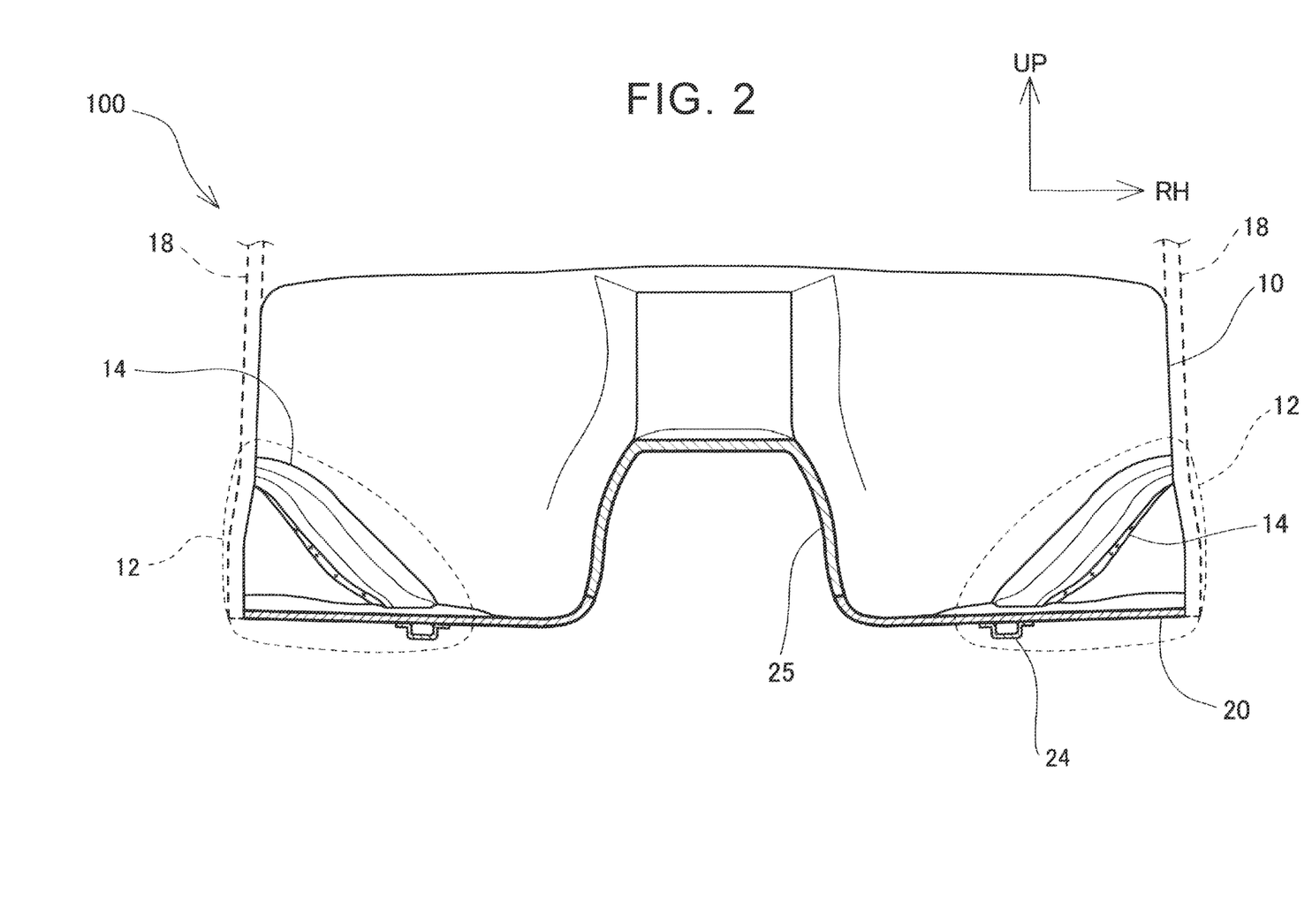
FIG. 2 is a view showing a section of a perpendicular face taken along the line A-A in FIG. 1, and a vertical surface of a dash panel seen from the rear in the vehicle front-rear direction.

The vehicle cabin 120 is a space where occupants are on board and surrounded by a rear surface of the dash panel 10 in the vehicle front-rear direction, a floor panel 20 that configures a floor surface, side surfaces (not shown), and a roof (not shown). The vehicle cabin 120 is mounted on the ladder frame 30 described later. A floor tunnel 25 is arranged in a center of the floor panel 20 in the vehicle width direction. The floor tunnel 25 has an upwardly projecting groove section and extends in the vehicle front-rear direction. The floor tunnel 25 is a space where an exhaust pipe and the like of the engine mounted inside the front compartment 110 pass. Further, rockers 21 that are strength members extending in the vehicle front-rear direction are attached to both ends of the floor panel 20 in the vehicle width direction, respectively. Cross reinforcing members 22 extending in the vehicle width direction are attached to an upper surface of the floor panel 20 between the rockers 21 and the floor tunnel 25. Further, a pair of right and left under members 24 serving as skeleton members extending in the vehicle front-rear direction is attached to a lower surface of the floor panel 20 between the rockers 21 and the floor tunnel 25. As shown in FIG. 2, the under members 24 are long members having a hat-shaped section projecting downwardly.

Figure 3:
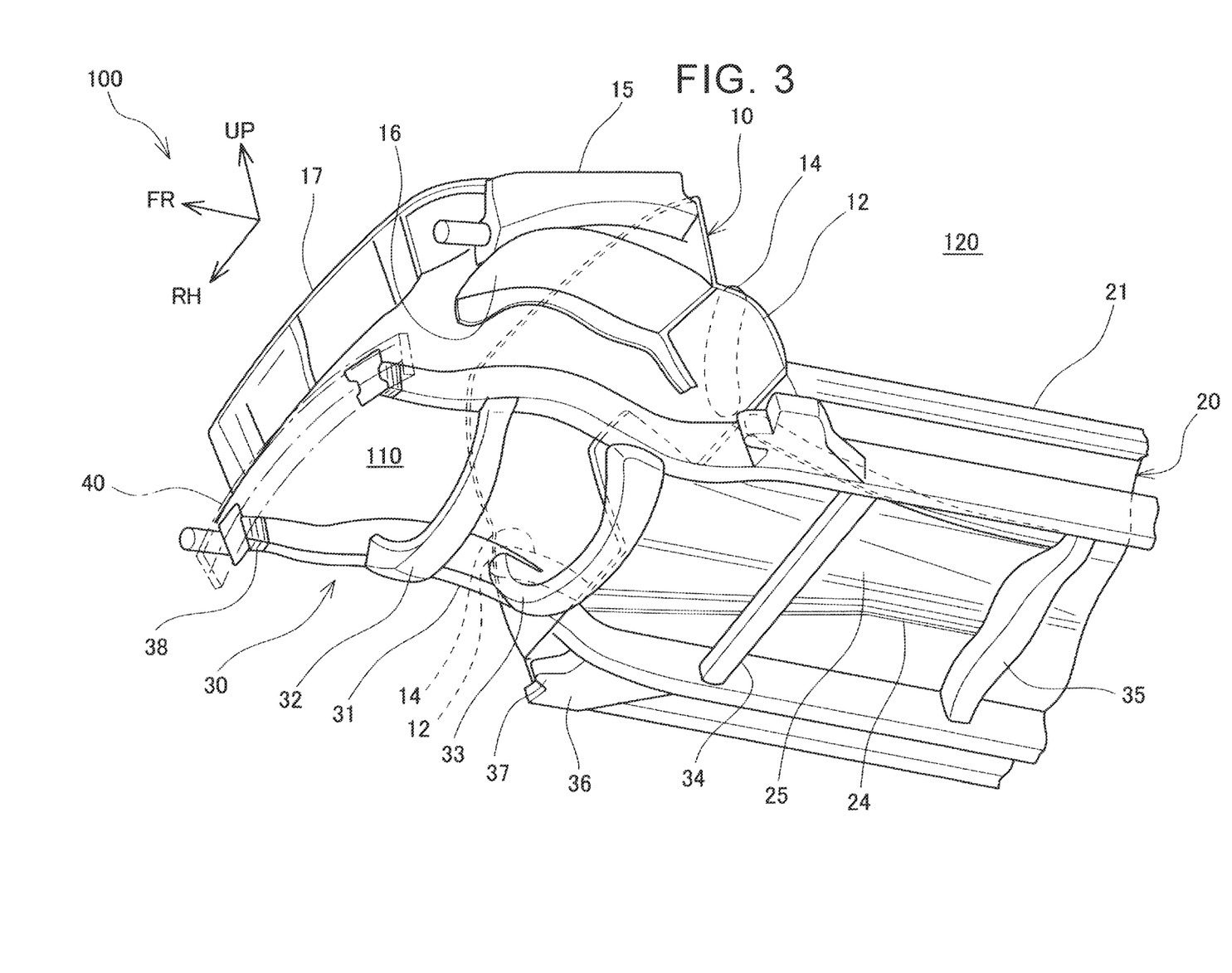
FIG. 3 is a perspective view of the vehicle front structure according to the embodiment, the vehicle front structure being seen from obliquely below and from a front in the vehicle front-rear direction.

As shown in FIG. 1, the dash panel 10 is a plate-shaped member that separates the front compartment 110 and the vehicle cabin 120 from each other, and a lower end of the dash panel 10 is connected with a front end portion of the floor panel 20, and a connecting portion is covered by a reinforcing plate 23. Further, both ends of the dash panel 10 in the vehicle width direction are connected with front pillars 18, respectively. Right and left lower half portions of the dash panel 10 are provided with wheel house portions 12, respectively. The wheel house portions 12 project towards the vehicle cabin 120. Each of the wheel house portions 12 has a curved surface that projects towards the vehicle cabin 120, and has an almost quarter arc-shaped curved surface in a view from the rear in the vehicle front-rear direction as shown in FIG. 2. As shown in FIG. 3, parts of the wheel house portions 12 of the dash panel 10, the parts being located on a side of the front compartment 110, are connected with rear ends of the wheel houses 16, respectively, and configure rear walls of the wheel houses 16, respectively. The wheel house portions 12 cover rear parts of the front tire wheel assemblies 50, respectively, in the vehicle front-rear direction.

As shown in FIG. 2, right and left dash members 14 are attached to surfaces of the right and left wheel house portions 12 on the side of the vehicle cabin 120, respectively. The dash members 14 obliquely extend downward and inward in the vehicle width direction from upper ends of the wheel house portions 12 in the vehicle width direction, respectively. The dash members 14 are members having a hat-shaped section, and flanges are spot-welded to surfaces of the wheel house portions 12 of the dash panel 10 on the side of the vehicle cabin 120, respectively. Lower end portions of the right and left dash members 14 are attached to the lower end of the dash panel 10 at positions in the vehicle width direction, respectively, the positions corresponding to positions of front ends of the under members 24, respectively, the under members 24 being attached under the floor panel 20.

Figure 4:
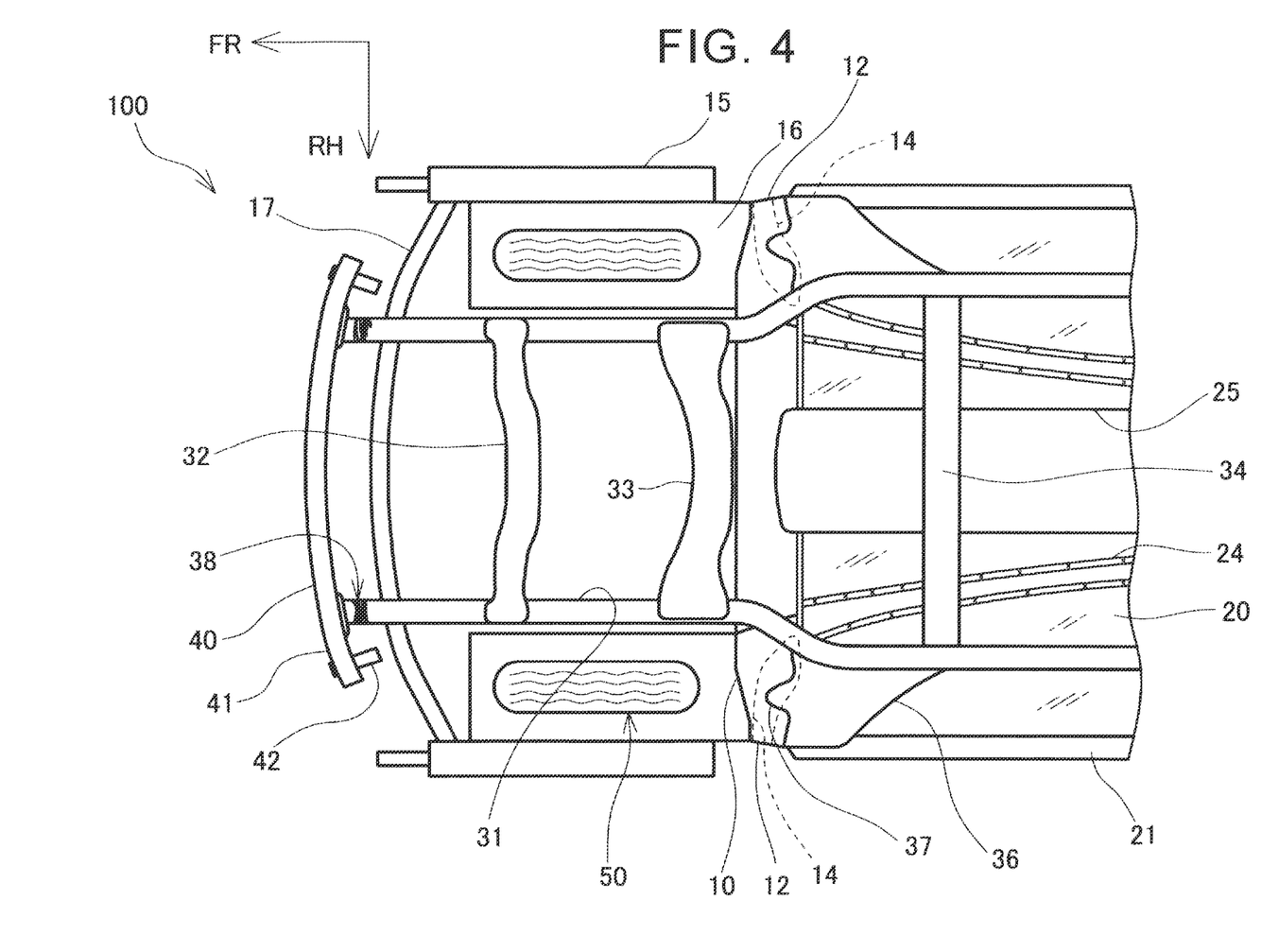
FIG. 4 is a bottom view of the vehicle front structure according to the embodiment, the vehicle front structure being seen from below in the vehicle upper-lower direction.

As shown in FIG. 3 and FIG. 4, the ladder frame 30 on which the vehicle cabin 120 is mounted includes a pair of side frames 31 and cross members 32, 33, 34, 35. The side frames 31 are right and left side skeleton members located on inner sides of the right and left front tire wheel assemblies 50 in the vehicle width direction, respectively, and extend from the front compartment 110 towards the vehicle cabin 120 in the vehicle front-rear direction. The cross members 32, 33, 34, 35 connect the side frames 31 with each other in the vehicle width direction. Stopper members 36 are attached on outer surfaces of the right and left side frames 31 in the vehicle width direction, respectively, the right and left side frames 31 being positioned under the right and left wheel house portions 12, respectively. The stopper members 36 protrude outward with respect to the side frames 31 in the vehicle width direction, respectively, and include projections 37 projecting frontward from front ends of the stopper members 36 in the vehicle front-rear direction, respectively. Further, mounts on which the vehicle cabin 120 is mounted are attached to the stopper members 36, respectively, and the vehicle cabin 120 is mounted on top of the stopper members 36.

As shown in FIG. 4, front end parts of the side frames 31 are configured as crash boxes 38, respectively, that have lower strength compared to parts of the side frames 31 behind the front end parts. A bumper reinforcement 40 extending in the vehicle width direction is connected between the right and left crash boxes 38. Load transmitting members 42 are attached to side end portions 41 of the bumper reinforcement 40, respectively, the side end portions 41 projecting outward with respect to the side frames 31 in the vehicle width direction, respectively. The load transmitting members 42 obliquely extend rearward in the vehicle front-rear direction and inward with respect to the vehicle from the side end portions 41 of the bumper reinforcement 40, respectively, and serve as members that abut on the side frames 31 and transmit a collision load to the side frames 31, respectively, when the vehicle collides.

Figure 5:
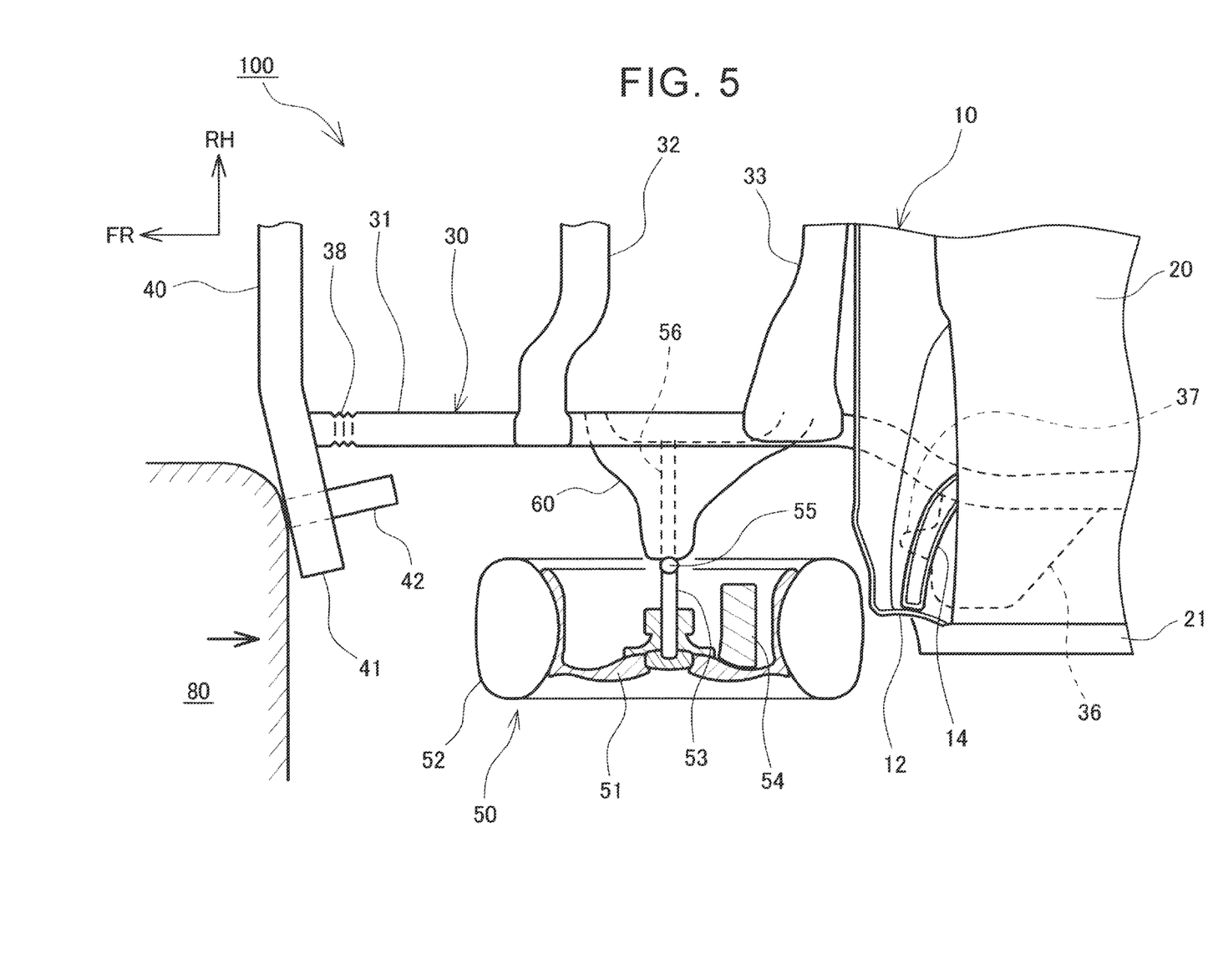
FIG. 5 is a plan view of an initial state of a small overlap collision.

Deformation of each part of the vehicle having the vehicle front structure 100 configured as described above when the vehicle has a small overlap collision is described with reference to FIG. 5 to FIG. 10. The small overlap collision is a collision mode in which an object collides with a quarter of the vehicle on the outer side of the vehicle in the vehicle width direction, and, in a collision test, the vehicle is made to collide with a barrier 80. As shown in FIG. 5, in the description below, the front tire wheel assembly 50 includes a wheel 51 made of metal such as aluminum and steel, a rubber tire portion 52 that is fitted into an outer periphery of the wheel 51, and a brake system 54 arranged inside the wheel 51. The front tire wheel assembly 50 is suspended by a suspension structure 60 attached to the cross members 32, 33 of the side frame 31, and an axle 53 is connected with a steering system 56 on a vehicle body side through a connecting member 55.

Figure 6:
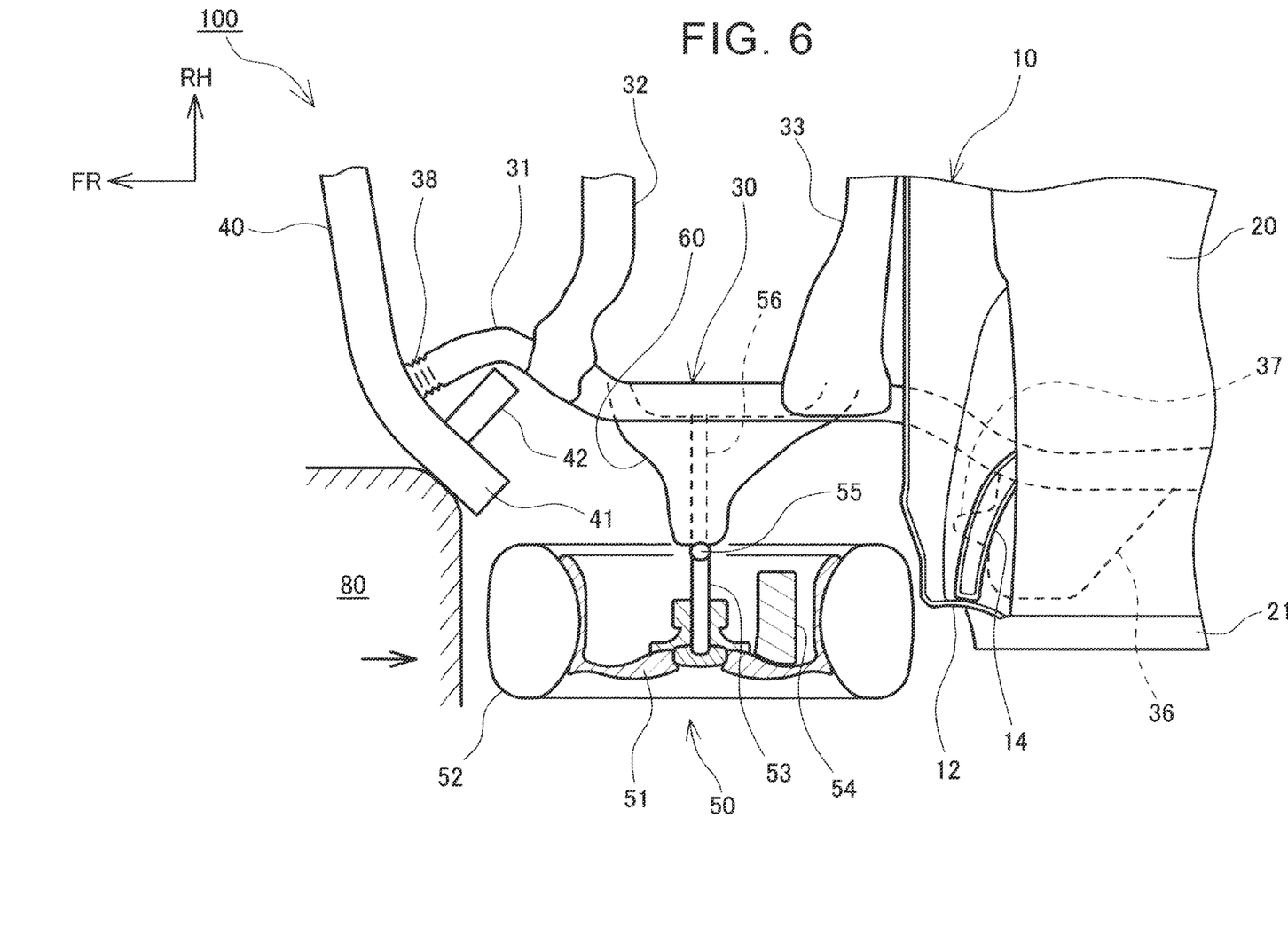
FIG. 6 is a plan view a state of an early-to-middle stage of the small overlap collision in which a side frame is deformed by bending.

As shown in FIG. 5, the barrier 80 collides with an outer part of the vehicle with respect to the side frame 31. As shown in FIG. 5, in an initial stage of the small overlap collision, the barrier 80 collides with a front end portion of the load transmitting member 42 provided in the side end portion 41. As shown in FIG. 6, in an early-to-middle stage of the collision, a collision load is transmitted to the crash box 38 of the side frame 31, and the crash box 38 is crushed. Also, at the same time, the side end portion 41 of the bumper reinforcement 40 is bent while being retracted, and a rear end of the load transmitting member 42 is directed further inward and also moved inward with respect to the vehicle. Further, the rear end of the load transmitting member 42 abuts on a side surface of the side frame 31 so that the collision load is transmitted to the side frame 31. As a result, the side frame 31 is bent inward with respect to the vehicle.

Figure 7:
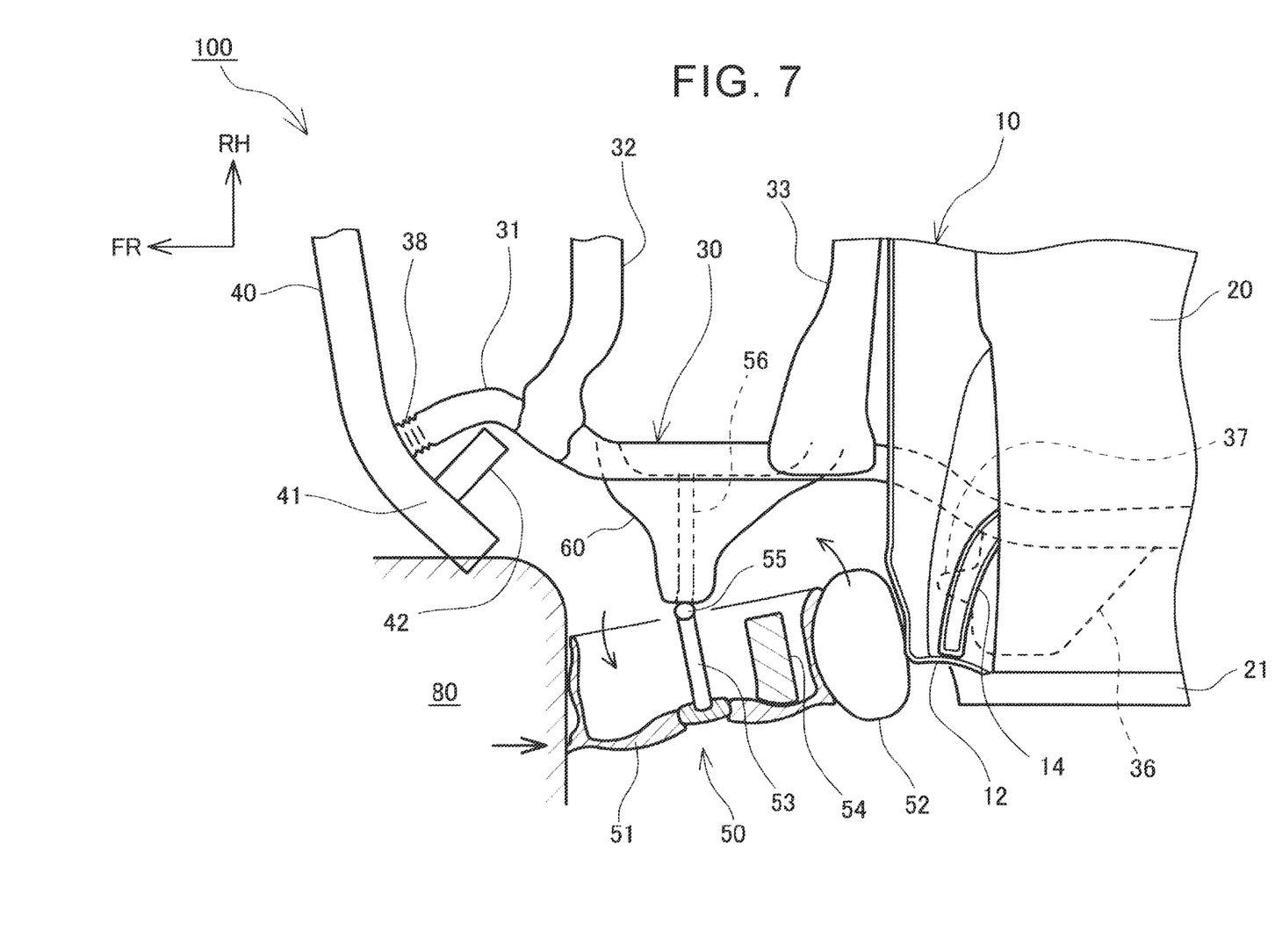
FIG. 7 is a plan view of a state of a middle stage of the small overlap collision in which a barrier comes into contact with a wheel of a front tire wheel assembly.
Figure 8:
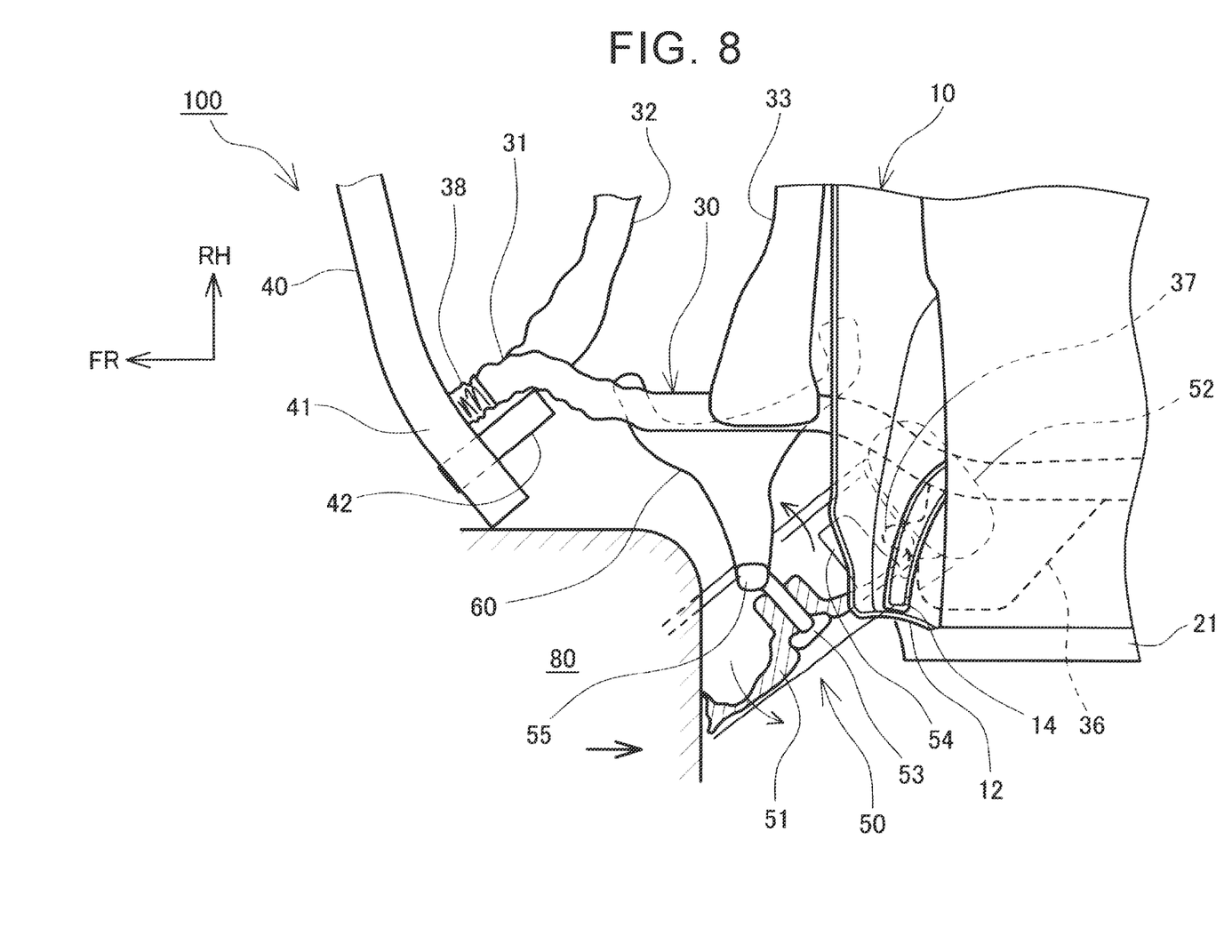
FIG. 8 is a plan view of a state of a middle-to-late stage of the small overlap collision in which the wheel of the front tire wheel assembly comes into contact with a stopper member.

As shown in FIG. 7, in a middle stage of the collision, the barrier 80 passes an outer side of the side end portion 41 of the bumper reinforcement 40 and comes into contact with the wheel 51 of the front tire wheel assembly 50. Thus, the front tire wheel assembly 50 rotates so that its front part is located on the outer side with respect to the vehicle, and its rear part is located on the inner side with respect to the vehicle. Then, as shown in FIG. 8, in a middle-to-late stage of the collision, the barrier 80 is retracted further and thus causes the suspension structure 60 to retract. Then, the barrier 80 causes the front tire wheel assembly 50 to retract while rotating the front tire wheel assembly 50. As a result, the wheel 51 or the brake system 54 of the front tire wheel assembly 50 comes into contact with the projection 37 of the stopper member 36. The projection 37 of the stopper member 36 is engaged with the wheel 51 or the brake system 54 of the front tire wheel assembly 50 and determines a position at which the front tire wheel assembly 50 abuts on the stopper member 36.

Figure 9:
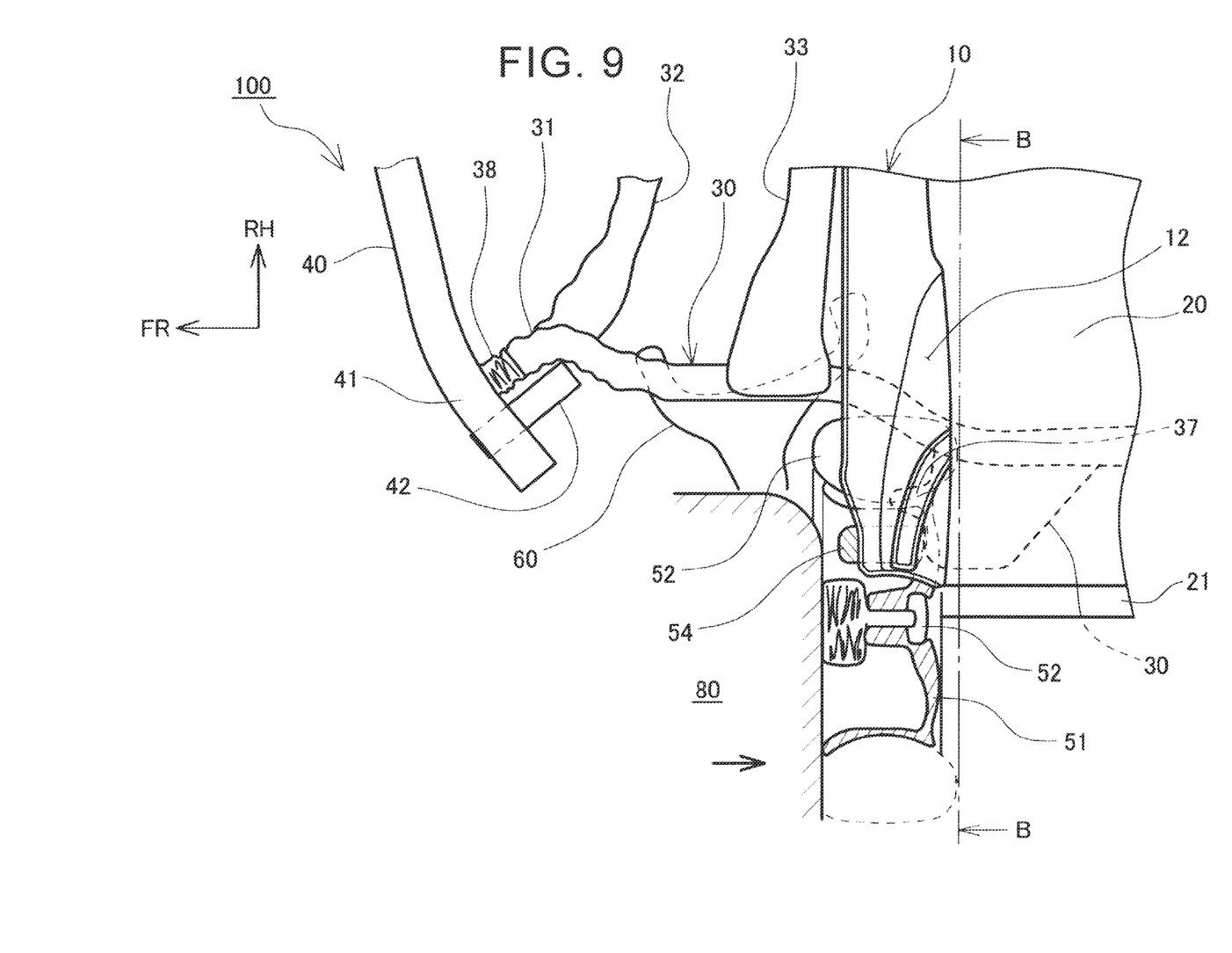
FIG. 9 is a plan view of a state of an end stage of the small overlap collision in which the front tire wheel assembly is rotated so that an axle is directed in the vehicle front-rear direction, and the wheel is engaged with the stopper member.
Figure 10:
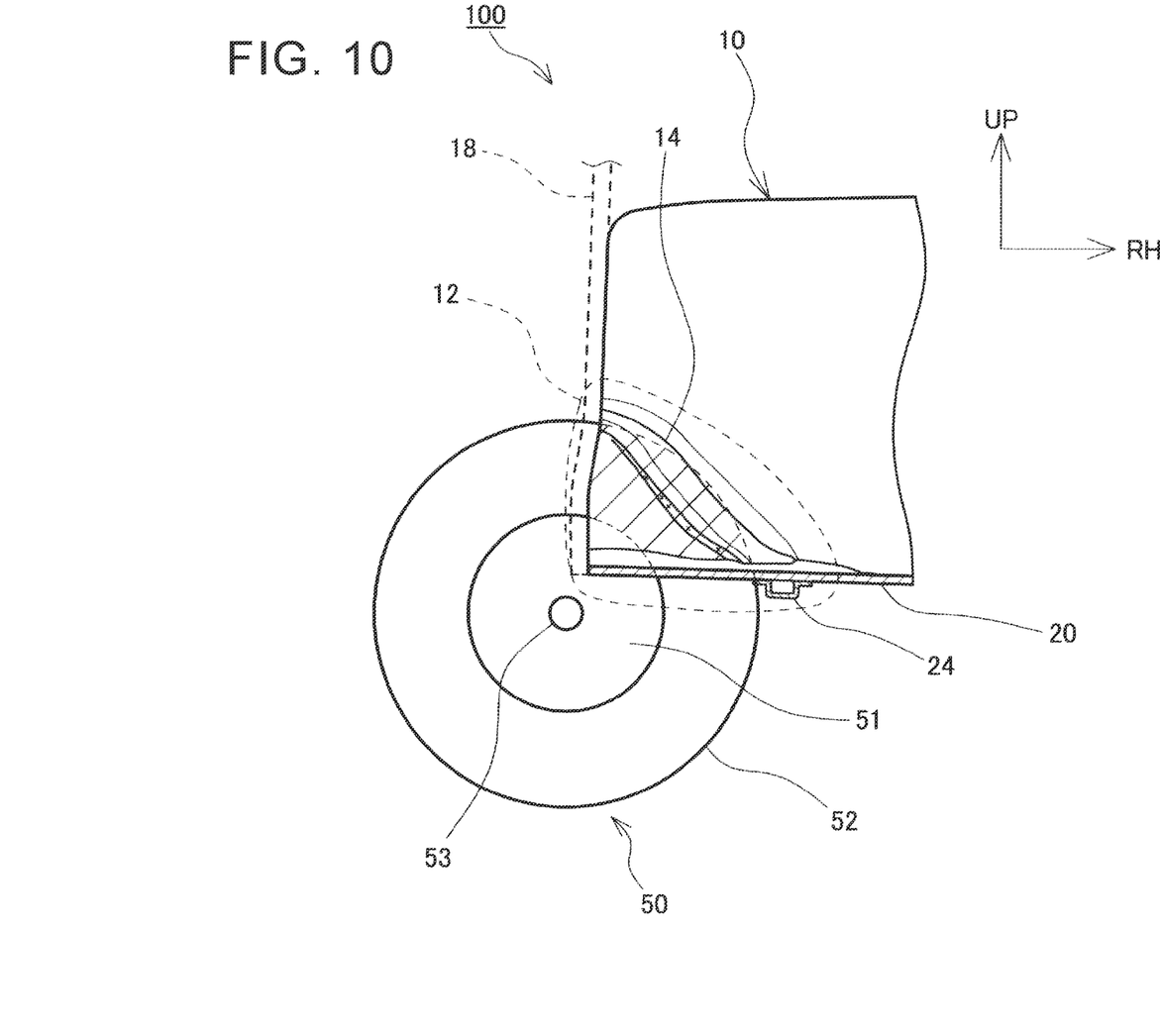
FIG. 10 is a sectional view taken along the line B-B in FIG. 9.

As shown in FIG. 9, at an end stage of the collision, the wheel 51 abuts on a front end of the stopper member 36 in a state where the front tire wheel assembly 50 is rotated so that the axle 53 is directed in the vehicle front-rear direction. As shown in FIG. 10, a half of the front tire wheel assembly 50 that is rotated to the outer side in the vehicle width direction projects to the outer side in the vehicle width direction. Then, an upper part of the tire portion 52 rotated to the inner side with respect to the vehicle comes into contact with the wheel house portion 12 of the dash panel 10 on the side of the front compartment 110. At this time, as shown by hatching in FIG. 10, a quarter arc portion of the tire portion 52 of the front tire wheel assembly 50 comes into contact with a surface of the wheel house portion 12 on the side of the front compartment 110. Then, a collision load is input from the tire portion 52 to the wheel house portion 12 of the dash panel 10.

As shown in FIG. 10, the dash member 14 is attached so that the dash member 14 starts from an upper end of the wheel house portion 12 in the vehicle width direction and continues downward and inward in the vehicle width direction. Thus, the dash member 14 is arranged so that, in a view from the rear in the vehicle front-rear direction, the position of the dash member 14 overlaps a hatched region in FIG. 10. The hatched region is a region where the collision load is input to the wheel house portion 12 from the tire portion 52 of the front tire wheel assembly 50. Therefore, the dash member 14 is able to receive the collision load suitably, the collision load being input to the wheel house portion 12 from the tire portion 52 of the front tire wheel assembly 50.

Further, the lower end portion of the dash member 14 is attached to the lower end of the dash panel 10 at the position in the vehicle width direction, the position corresponding to the position of the front end of the under member 24 that is attached under the floor panel 20. Therefore, the collision load received by the dash member 14 is transmitted to the under member 24 from the lower end of the dash member 14 smoothly, and received by the under member 24. Further, both ends of the dash panel 10 in the vehicle width direction are connected with the front pillars 18, respectively. Therefore, the collision load is transmitted from an upper end portion of the dash member 14 to the front pillar 18 and received also by the front pillar 18. As a result, at the time of a small overlap collision, it is possible to reduce an amount of retraction of the dash panel 10.

Moreover, at the time of a small overlap collision, the projection 37 of the stopper member 36 is engaged with the wheel 51 or the brake system 54 of the front tire wheel assembly 50, and thus restricts the position of the front tire wheel assembly 50. Thus, it is possible to ensure that the region where a collision load is input to the wheel house portion 12 from the tire portion 52 of the front tire wheel assembly 50 overlaps the position of the dash member 14 even more reliably. Therefore, it is possible that the dash member 14 receives a collision load input to the wheel house portion 12 from the tire portion 52 of the front tire wheel assembly 50 more suitably, and it is thus possible to reduce retraction of the dash panel 10 more suitably at the time of a small overlap collision.

Figure 11:
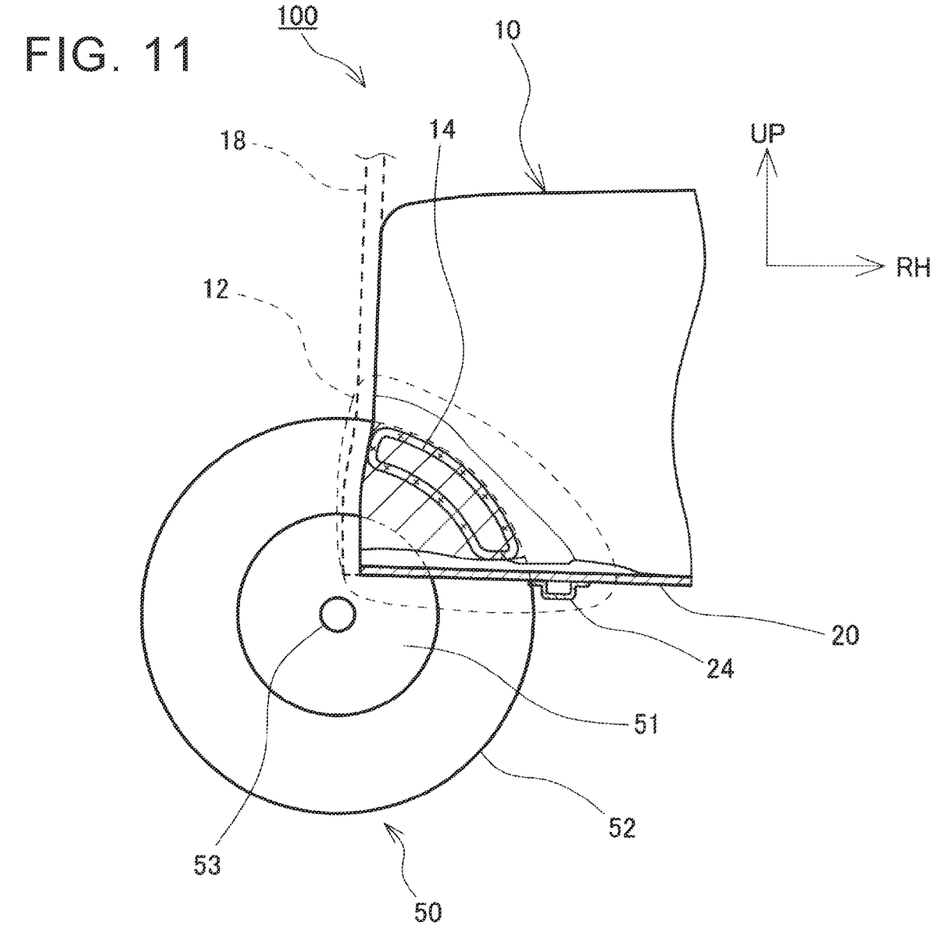
FIG. 11 is a sectional view of a vehicle front structure according to another embodiment, taken along the line B-B in FIG. 9.

Further, instead of the oblique arrangement of the dash member 14, the dash member 14 may be configured so as to obliquely extend downward and inward in the vehicle width direction from an upper end of the wheel house portion 12 in the vehicle width direction along a curved line that projects in the upward and inward directions with respect to the vehicle as shown in FIG. 11. In this case, the dash member 14 may be configured so as to obliquely extend downward and inward in the vehicle width direction from the upper end of the wheel house portion 12 in the vehicle width direction along an arc similar to that of a radius of the tire portion 52 of the front tire wheel assembly 50.

With such a configuration, an overlap region between the dash member 14 and the hatched region in FIG. 10 increases. In the hatched region, the collision load is input to the wheel house portion 12 from the tire portion 52 of the front tire wheel assembly 50 at the time of a small overlap collision. Thus, the dash member 14 is able to receive the collision load more suitably, and it is thus possible to reduce refraction of the dash panel 10 more suitably at the time of a small overlap collision.

In the embodiment described above, description is given regarding the vehicle front structure 100 of the vehicle in which the ladder frame 30 is used. However, the disclosure is not limited to this, and is also applicable to a vehicle having a monocoque frame. In the case of the monocoque frame, a front side member serves as a side skeleton member.

What is claimed is:

1. A vehicle front structure comprising:
a dash panel that separates a front compartment in a front part of a vehicle and a vehicle cabin from each other; and
a plurality of reinforcing members attached to a surface of the dash panel on a side of the vehicle cabin, wherein:
right and left wheel house portions are provided in right and left lower half portions of the dash panel, respectively, the right and left wheel house portions projecting towards the vehicle cabin and configuring rear walls of wheel houses for front tire wheel assemblies, respectively; and
the reinforcing members are attached to surfaces of the wheel house portions on the side of the vehicle cabin, respectively so that the reinforcing members obliquely extend downward and inward in a vehicle width direction from upper ends of the wheel house portions in the vehicle width direction, respectively.

2. The vehicle front structure according to claim 1, wherein the reinforcing members obliquely extend downward and inward in the vehicle width direction from the upper ends of the wheel house portions in the vehicle width direction along curved lines, respectively so that at least parts of the reinforcing members project upward and inward with respect to the vehicle.

3. The vehicle front structure according to claim 2, wherein the curved line is an arc of a radius similar to a radius of a tire portion of the front tire wheel assembly.

4. The vehicle front structure according to claim 1, comprising a floor panel that configures a floor of the vehicle cabin and includes a pair of right and left skeleton members extending in a vehicle front-rear direction, the right and left skeleton members being attached to the floor panel between both ends of the floor panel in the vehicle width direction, and a center of the floor panel in the vehicle width direction, respectively, wherein:
- a lower end portion of the dash panel is connected with a front end portion of the floor panel; and
- lower end portions of the reinforcing members are attached to a lower end of the dash panel at positions in the vehicle width direction, respectively, the positions corresponding to positions of front ends of the skeleton members, respectively.

5. The vehicle front structure according to claim 1, comprising:
- a pair of right and left side skeleton members that extends in a vehicle front-rear direction towards the vehicle cabin from the front compartment, the right and left side skeleton members being located on inner sides of the right and left front tire wheel assemblies in the vehicle width direction, respectively; and
- stopper members that include projections, respectively, the projections projecting frontward in the vehicle front-rear direction from front ends of the stopper members, respectively, the stopper members being attached to outer surfaces of the side skeleton members in the vehicle width direction, respectively so that the stopper members are positioned under the wheel house portions of the dash panel, respectively.

* * * * *